US010703878B2

(12) United States Patent
Endtner et al.

(10) Patent No.: US 10,703,878 B2
(45) Date of Patent: Jul. 7, 2020

(54) POLYMER COMPOSITIONS

(71) Applicant: LANXESS Deutschland GmbH, Cologne (DE)

(72) Inventors: Jochen Endtner, Cologne (DE); Matthias Bienmueller, Krefeld (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 15/245,606

(22) Filed: Aug. 24, 2016

(65) Prior Publication Data

US 2017/0058099 A1 Mar. 2, 2017

(30) Foreign Application Priority Data

Aug. 26, 2015 (EP) .................................... 15182481

(51) Int. Cl.
| | | |
|---|---|---|
| *C08K 3/34* | (2006.01) | |
| *C08L 77/02* | (2006.01) | |
| *C08L 77/06* | (2006.01) | |
| *C08K 3/22* | (2006.01) | |
| *B29C 45/00* | (2006.01) | |
| *C08K 5/3492* | (2006.01) | |
| *C08K 7/14* | (2006.01) | |
| *C08K 13/02* | (2006.01) | |
| *B29K 77/00* | (2006.01) | |
| *B29K 509/08* | (2006.01) | |

(52) U.S. Cl.
CPC ............ *C08K 3/34* (2013.01); *B29C 45/0005* (2013.01); *B29C 45/0055* (2013.01); *C08K 3/22* (2013.01); *C08K 5/34924* (2013.01); *C08K 7/14* (2013.01); *C08K 13/02* (2013.01); *C08L 77/02* (2013.01); *C08L 77/06* (2013.01); *B29K 2077/00* (2013.01); *B29K 2509/08* (2013.01); *C08K 2003/2241* (2013.01); *C08K 2201/003* (2013.01); *C08K 2201/004* (2013.01); *C08K 2201/005* (2013.01); *C08K 2201/016* (2013.01)

(58) Field of Classification Search
CPC ........ C08K 3/34; C08K 3/22; C08K 5/34924; C08K 7/14; C08K 13/02; B29C 45/0005; B29C 45/0055; C08L 77/02; C08L 77/06
See application file for complete search history.

(56) References Cited

U.S. PATENT DOCUMENTS

| | | | |
|---|---|---|---|
| 3,644,574 A | 2/1972 | Jackson, Jr. et al. | |
| 3,995,082 A | 11/1976 | Minhinnick et al. | |
| 4,097,446 A | 6/1978 | Abolins et al. | |
| 4,806,593 A | 2/1989 | Kress et al. | |
| 4,812,515 A | 3/1989 | Kress et al. | |
| 4,859,740 A | 8/1989 | Damrath et al. | |
| 4,861,831 A | 8/1989 | Damrath et al. | |
| 4,937,285 A | 6/1990 | Wittmann et al. | |
| 9,050,843 B2 | 6/2015 | Duijnhoven Van et al. | |
| 9,969,866 B2 | 5/2018 | Bienmueller et al. | |
| 2006/0058432 A1* | 3/2006 | Perego ................ | C08K 5/5313 524/115 |
| 2007/0072967 A1* | 3/2007 | Nass ................... | C08K 5/5313 524/100 |
| 2011/0039470 A1 | 2/2011 | Wakeman et al. | |
| 2012/0165439 A1* | 6/2012 | Endtner .................. | C08K 3/40 524/101 |
| 2013/0296468 A1 | 11/2013 | Endtner et al. | |
| 2016/0101592 A1 | 4/2016 | Sauer et al. | |

FOREIGN PATENT DOCUMENTS

| | | |
|---|---|---|
| CN | 103013104 A | 4/2013 |
| DE | 3813694 A1 | 11/1989 |
| DE | 4236122 A1 | 4/1994 |
| DE | 202014008690 U1 | 12/2014 |

OTHER PUBLICATIONS

European Search Report from corresponding European Application No. 15182481, dated Dec. 15, 2015, two pages.
Duarzwerke GmbH, Sikron Quartz Product Data, 1205, 10/15, four pages.
Translation of https://de.wikipedia.org/wiki/Quarz, obtained from the Internet on Jan. 10, 2019, p. 1 of 17 pages.
Translation of http://de.wikipedia.org/wiki/Leitungsschutzschalter, obtained from the Internet on Jan. 10, 2019, p. 1 of 8 pages.
Translation of http://de.wikipedia.org/wiki/Fehlerstromschalter, obtained from the Internet on Jan. 10, 2019, p. 1 of 19 pages.
Translation of http://de.wikipedia.org/wiki/Glas, obtained from the Internet on Jan. 10, 2019, p. 1 of 44 pages.
Translation of http://de.wikipedia.org/wiki/Faser-Kunststoff-Verbund, obtained from the Internet on Jan. 10, 2019, p. 1 of 15 pages.
Turkovich et al., "Fibre Fracture in Reinforced Thermoplastic Processing", Polym. Eng. and Sci. 23, 1983, pp. 743-749.
Translation of http://de.wikipedia.org/wiki/Glasfaser, obtained from the Internet on Jan. 10, 2019, p. 1 of 8 pages.
Meixner, Kunststoffe International 8, 2008, pp. 119-121.
Translation of http://wiki.r-g.de/index.php?title=Glasfasern, obtained from the Internet on Jan. 10, 2019, p. 1 of 9 pages.
Bottenbruch, Kunststoff-Handbuch 3/4, Polyamide, Carl Hanser Verlag, Munich 1998, pp. 374-384.

* cited by examiner

*Primary Examiner* — John E Uselding
(74) *Attorney, Agent, or Firm* — Nicanor A. Kohncke

(57) ABSTRACT

Polymer compositions, such as polyamide-based compositions, include melamine cyanurate, nepheline syenite, and glass fibres.

20 Claims, No Drawings

POLYMER COMPOSITIONS

The present invention relates to polymer compositions comprising melamine cyanurate, nepheline syenite and glass fibres.

BACKGROUND INFORMATION

In order to modify their treatment, processing and use behaviour, plastics materials are for the most part provided with auxiliary substances as well as with fillers and reinforcing materials. The latter improve properties such as stiffness, strength, heat resistance, dimensional stability and reduce the thermal expansion of products based on plastics materials.

Of particular importance for plastics compositions are fillers and reinforcing materials of minerals or glass, in particular borosilicate glass or silicate glass, which is used in a very wide variety of forms, for example in the form of glass fibres, glass flocks or also in the form of expanded or foam glass. Fillers and reinforcing materials have a considerable influence on the heat deflection temperature of plastics materials. For example, when fibrous fillers having a correspondingly high length-to-diameter ratio are used, very good heat deflection temperatures are achieved. However, the anisotropic geometry of a fibre leads to the fibres being aligned in the direction of flow during processing and, associated therewith, to anisotropic shrinkage during processing, which consequently results in undesirable warpage in the products. The "wicking" associated with the fibres also leads to a deterioration of the self-extinguishing properties of these products, as are important, for example, in the glow wire test according to IEC 60695-2-12 (GWFI). In order to be able to ensure adequate flame resistance of plastics-based products even when using fibrous fillers, such as, for example, glass fibres, it is generally necessary to use halogen- or phosphorus-based flame retardants. Halogen-based flame retardants are the subject of public debate because of their accumulation in the environment. Phosphorus-based flame retardants are willingly avoided because their production is energy-intensive. In addition, there is the risk with phosphorus-containing flame retardants of corrosive deposits on electrical contacts if the product in question is an electrical component or electronic component.

Although isotropic shrinkage is obtained in products when non-fibrous fillers, in particular talc, clay minerals, mica, expanded or foam glass, are used, the moulding compositions to be used therefor and the products to be produced therefrom then frequently have unsatisfactory heat deflection temperatures (<135° C.) or inadequate self-extinguishing properties in the GWFI test at thinner wall thicknesses (<1 mm).

EP 2 468 810 A1 describes in Example 3 a polyamide-based composition which, as well as comprising melamine cyanurate, comprises ground glass and also ground chopped glass fibres. Disadvantages of this composition are its poor heat deflection temperature and, associated therewith, a considerably limited usability in electrical components, such as, for example, circuit breakers. In addition, the types of ground glass used therein to produce the glass have to undergo a very energy-intensive working step.

CN 103 013 104 A describes flame-retarded nylon-6-based compositions based on halogen-free flame retardants comprising melamine cyanurate and talc as inorganic filler.

DE 20 2014 008 6907 U1 describes a polyamide-based composition which, as well as comprising melamine cyanurate, comprises quartz powder and also chopped long glass fibres. A disadvantage of this composition is that the quartz used therein, owing to its high hardness [Mohs hardness 7 according to https://de.wikipedia.org/wiki/Quarz], results not only in increased abrasion in technical plants but also in damage to the glass fibres. Damage to the glass fibres in particular can lead to a deterioration of the mechanical properties and the heat deflection temperature of products to be produced therefrom.

A good heat deflection temperature and good mechanical properties with, at the same time, isotropic shrinkage behaviour and good self-extinguishing properties in the GWFI test are, however, an important requirement for the use of polyamide-based compositions in electronic components of complex construction, in particular in RCDs and in miniature circuit breakers (RCD=residual current device).

According to "http://de.wikipedia.org/wiki/Leitungsschutzschalter", a miniature circuit breaker, MCB for short, also known colloquially as a safety cutout or cutout for short, is an overcurrent protective device in an electrical installation and is used in low-voltage systems. RCD refers to residual current devices (see http://de.wikipedia.org/wiki/Fehlerstromschalter).

Accordingly, the object of the present invention was to provide polymer compositions, such as polyamide compositions, which are suitable for the production of products for the electrical industry, wherein those products are distinguished by a high heat deflection temperature with, at the same time, low isotropic shrinkage behaviour, by good self-extinguishing properties in the glow wire test according to IEC60695-2-12 even at thin wall thicknesses of about 0.8 mm, and can be obtained, as compared with the prior art, using raw materials that have an alveolar, crystalline silicon dioxide content of less than 1%, have a Mohs hardness of less than 7 and are obtainable, as compared with ground glass, without an energy-intensive melting process.

According to "http://de.wikipedia.org/wiki/W%C3%A4rmeformbest%C3%A4ndigkeit", the heat deflection temperature is a measure of the temperature resistance of plastics materials. Because of their viscoelastic material behaviour, there is no strictly defined upper use temperature for plastics materials; instead, an equivalent parameter under a defined load is used. Two standardized methods are available for that purpose, the heat deflection temperature (HDT) method and the Vicat softening temperature (VST) method.

The method for determining the heat deflection temperature described in DIN EN ISO 75-1,-2,-3 (precursor. DIN 53461) uses standard test specimens of rectangular cross-section which are subjected, preferably in the edgewise direction, to three-point bending under constant load. Depending on the height of the test specimen, in order to achieve a so-called outer fibre stress $\sigma_f$ of 1.80 (method A), 0.45 (method B) or 8.00 N/mm² (method C), a force $F=2\sigma_f bh^2/3$ L, wherein b represents with width of the specimen, h represents the height of the specimen and L represents the support distance, is applied by means of weights or/and springs. The loaded specimens are then heated at a constant heating rate of 120 K/h (or 50 K/h). If the deflection of the specimen thereby reaches an outer fibre strain of 0.2%, the associated temperature is the heat deflection temperature HDT (or heat distortion temperature).

The Vicat softening temperature (VST) according to DIN EN ISO 306 (precursor: DIN 53460) is measured using a needle (having a circular cross-section of 1 mm²). The needle is loaded with a test force of 10 N (test force A) or 50 N (test force B). The test specimen having a permissible thickness of from 3 to 6.4 mm is exposed to a defined heating rate of 50 or 120 K/h. The VST is reached when the penetrator reaches a depth of penetration of 1 mm. According to the standard, the test is to be applied only in the case of thermoplastics and gives information about the practical long-term use limit, which is approximately 15 K below the Vicat temperature. Four parameter combinations are obtained by varying the boundary conditions:

VST/A50
VST/A120
VST/B50 (preferred method for comparative tests (ISO 10350-1))
VST/B120.

According to "http://de.wikipedia.org/wiki/Schwindung#Schwindung_bei_Gie.C3.9Fharzen", shrinkage is the change in volume of a material or workpiece without material being removed or pressure being exerted. Shrinkage occurs as a result of drying, cooling or chemical or physical rearrangement mechanisms in the material. Low shrinkage in the case of casting resins based on thermoplastics is a quality criterion, since built-in components may otherwise be exposed to compressive stress and gaps may form with respect to other parts to be wetted if there is inadequate adhesion. In the case of injection moulded products in electrical engineering/electronics, shrinkage can lead to the penetration of moisture and to reduced dielectric strength. Isotropic shrinkage is understood by the person skilled in the art as being shrinkage that is equal in an spatial directions. The shrinkage behaviour is tested in accordance with DIN EN ISO 294-4, also within the scope of the present invention.

The energy-intensive production of glass from a mixture comprising silicon oxide ($SiO_2$), sodium oxide ($Na_2O$) and calcium oxide as well as optionally further additives is explained in http://de.wikipedia.org/wiki/Glas. The mixture must thereby be converted into a homogeneous glass melt, for example in continuously operating ovens at temperatures of approximately 1400° C. or more. The necessary energy for melting the glass must be provided by fossil fuels or electrical energy.

Surprisingly, it has now been found that, by using nepheine syenite in the form described in greater detail below in combination with glass fibres, melamine cyanurate and optionally titanium dioxide, polyamide-based compositions yield electrical and electronics articles which have excellent properties as regards heat deflection temperature, flame resistance in the glow wire test according to IEC60695-2-12 and isotropic shrinkage behaviour, without the nepheline syenite having to be subjected to an energy-intensive melting process.

SUMMARY

Accordingly, the invention provides compositions comprising
A) polymer
B) nepheline syenite,
C) glass fibres, and
D) melamine cyanurate.

In an embodiment, the polymer is preferably polyamide, more preferably semi-crystalline polyamides, and more particularly preferably polyamide 6 or polyamide 66.

For clarification, it is pointed out that the scope of the present invention includes all the general definitions and parameters listed hereinbelow or mentioned in preferred ranges, in any desired combinations. For clarification, it is further pointed out that, according to "http://de.wikieda.org/wiki/Faser-Kunststoff-Verbund", fibres are differentiated as follows:

chopped fibres, also referred to as short fibres, having a length in the range of from 0.1 to 1 mm,
long fibres having a length in the range of from 1 to 50 mm,
continuous fibres having a length L>50 mm, and
ground fibres having a length after grinding of typically in the range of from 70 to 200 µm.

The lengths indicated within the scope of the present invention are starting lengths. They thus relate to starting materials, in particular fibres, before processing of any kind, for example in a mixer. Within the scope of the processing of the compositions according to the invention to moulding compositions, components B) and C) to be used according to the invention as well as optionally further fillers of component K) are exposed to a very wide variety of forces in a mixer, preferably in an extruder, whereby the above length profile of fibres can be displaced to shorter lengths and even to lengths in the micrometre range. Accordingly, as a result of processing, the glass fibres to be used according to the invention as component C), preferably the long glass fibres to be used according to the invention, in the products according to the invention can ultimately have fibre lengths of about 0.1 to about 1 mm, or even down to the µm range. Mentioned standards apply in their version as applicable at the date of filing of this application.

Preferred Embodiments

Accordingly, the invention preferably further provides compositions comprising
100 parts by weight of component A),
from 10 to 75 parts by weight of component B),
from 2 to 12 parts by weight of component C), and
from 0.1 to 40 parts by weight of component D).

The compositions according to the invention are prepared for further use by mixing components A) to D), which are to be used as starting materials, in at least one mixer. Moulding compositions based on the compositions according to the invention are thereby obtained as intermediates. The moulding compositions can either consist solely of components A) to D) or can comprise, in addition to components A) to D), further components, preferably at least one of components E) to L) listed below.

In one embodiment, the compositions comprise, in addition to components A), B), C) and D), also E) titanium dioxide, preferably in amounts of from about 0.01 to about 30 parts by weight, based on 100 parts by weight of component A).

In one embodiment, the compositions comprise, in addition to components A) to E) or instead of E), also F) at least one lubricant and/or demoulding agent, preferably in amounts of about 0.01 to about 5 parts by weight, based on 100 parts by weight of component A).

In one embodiment, the compositions comprise, in addition to components A) to F) or instead of E) and/or F), also G) at least one laser absorber selected from the group antimony trioxide, tin oxide, tin orthophosphate, barium titanate, aluminium oxide, copper hydroxyphosphate, copper orthophosphate, potassium copper diphosphate, copper hydroxide, antimony tin oxide, bismuth trioxide and anthraquinone, preferably in amounts of about 0.01 to about 10 parts by weight, based on 100 parts by weight of component A).

In one embodiment, the compositions comprise, in addition to components A) to G) or instead of E) and/or F) and/or G), also H) at least one further flame retardant other than melamine cyanurate (=component D)), preferably in amounts of about 0.01 to about 60 parts by weight, based on 100 parts by weight of component A). Halogen-free and/or phosphorus-free flame retardants are preferably used as component H).

In one embodiment, the compositions comprise, in addition to components A) to H) or instead of E) and/or F) and/or G) and/or H), also K) at least one filler other than components B) and C), preferably in amounts of about 0.01 to about 60 parts by weight, based on 100 parts by weight of component A).

In one embodiment, the compositions comprise, in addition to components A) to K) or instead of components E) and/or F) and/or G) and/or H) and/or K), also L) at least one further additive other than components D) to K), preferably in amounts of about 0.01 to about 30 parts by weight, based on 100 parts by weight of component A).

Particular preference is given to compositions comprising polyamide 6 as component A), nepheline syenite as component B), glass fibres as component C), preferably glass fibres of E-glass, particularly preferably glass fibres having a mean fibre diameter of about 10 μm to about 12 μm and/or a mean fibre length of about 4 to about 5 mm, melamine cyanurate as component D), ethylene-bis-stearylamide as component H), and 3,3'-bis(3,5-di-tert-butyl-4-hydroxyphenyl)-N,N'-hexamethylenedipropionamide as component L).

Component A)

The compositions comprise polyamide as component A). Polyamides which are preferably to be used are semi-crystalline polyamides. PA 6 [CAS No. 25038-54-4] or PA 66 [CAS No. 32131-17-2] are particularly preferably used. Copolyamides based on PA 6 and/or PA 66 are included in the subject-matter of the present invention.

The identification of the polyamides used within the scope of the present application corresponds to the international standard, whereby the first figure(s) indicate(s) the number of carbon atoms of the starting diamine and the last figure(s) indicate(s) the number of carbon atoms of the dicarboxylic acid. If only one figure is given, as in the case of PA6, this means that the starting material used was an α,ω-aminocarboxylic acid, or the lactam derived therefrom, for example in the case of PA 6 the ε-caprolactam; reference is further made to H. Domininghaus, Die Kunststoffe und ihre Eigenschaften, pages 272 if, VDI-Verlag, 1976.

The polyamide 6 or polyamide 66 to be used as component A) preferably has a viscosity number, determined in accordance with ISO 307 In a 0.5% by weight solution in 96% by weight sulphuric acid at 25° C., of about 80 to about 180 ml/g.

The polyamide 6 to be used as component A) particularly preferably has a viscosity number, according to the mentioned standard and according to the above-mentioned method, in the range of about 85 to about 160 ml/g, most particularly preferably a viscosity number in the range of about 90 to about 140 ml/g.

The polyamide 66 to be used as component A) particularly preferably has a viscosity number, according to the above-mentioned method, in the range of about 110 to about 170 ml/g, most particularly preferably a viscosity number in the range of about 130 to about 160 m/g.

According to Hans Domininghaus in "Die Kunststoffe und ihre Eigenschaften", 5th edition (1998), p. 14, thermoplastic polyamides are understood as being polyamides whose molecule chains have no side branches or alternatively have side branches of greater or lesser length in varying numbers, which polyamides soften when heated and can be moulded almost as desired.

The polyamides to be used according to the invention as component A) can be produced by various methods and synthesized from very different building blocks and, in specific applications, can be provided alone or in combination with processing aids, stabilizers or also polymeric alloy partners, preferably elastomers, to give materials having specially adjusted property combinations. Also suitable are blends with proportions of other polymers, preferably of polyethylene, polypropylene, ABS, whereby one or more compatibilizers can optionally be used. The properties of the polyamides can be improved by adding elastomers, for example in respect of impact strength. The variety of possible combinations permits a very large number of products having very different properties.

A large number of procedures are known for producing polyamides, wherein it is possible, according to the desired end product, to use different monomer building blocks, different chain regulators for establishing a desired molecular weight or also monomers having reactive groups for aftertreatments that are to be carried out later.

The technically relevant methods for producing polyamides mostly proceed via polycondensation in the melt. Within the scope of the present invention, the hydrolytic polymerization of lactams is also understood as being polycondensation.

Polyamides or copolyamides which are preferably to be used according to the invention as component A) are those which are produced starting from diamines and dicarboxylic acids and/or lactams having at least 5 ring members or corresponding amino acids. There come into consideration as starting materials preferably aliphatic dicarboxylic acids, particularly preferably adipic acid, aliphatic diamines, particularly preferably hexamethylenediamine, aminocarboxylic acids, in particular aminocaproic acid, or the corresponding lactams. Copolyamides of a plurality of the mentioned monomers are included.

The PA 6 and PA 66 preferably to be used as component A) are semi-crystalline polyamides. According to DE 10 2011 084 519 A1, semi-crystalline polyamides have an enthalpy of fusion in the range of about 4 to about 25 J/g, measured by the DSC method according to ISO 11357 in the 2nd heating and with integration of the melting peak. By contrast, amorphous polyamides have an enthalpy of fusion of less than 4 J/g, measured by the DSC method according to ISO 11357 in the 2nd heating and with integration of the melting peak.

The polyamide 6 which is particularly preferably to be used as component A) is obtainable from ε-caprolactam. The polyamide 66 which is preferably to be used as component A) is obtainable from hexamethylenediamine and adipic acid.

Preference is further given to most compounds based on PA 6, PA 66 or on copolyamides thereof, in which there are about 3 to about 11 methylene groups, most particularly preferably from 4 to 6 methylene groups, per polyamide group in the polymer chain.

Component B)

The compositions comprise nepheline syenite [CAS No. 37244-96-5] as component B).

Nepheline syenite is a naturally occurring rock which consists mainly of the minerals albite ($Na[AlSi_3O_a]$), microcline ($K[AlSi_3O_a]$) and nepheline ($(Na,K)[AlSiO_4]$) (CAS No. 1302-72-3). Nepheline syenite is inert and is distinguished by a Mohs hardness of 6.5 as well as a high degree of whiteness and excellent transparency. As is usual for naturally occurring rock, the nepheline syenite to be used according to the invention may be contaminated with other minerals. A precise description of the nepheline syenite to be used according to the invention as component B) as well as of impurities that are usual therein is given, for example, in "https://en.wikipedia.org/wiki/Nepheline_syenite". Commercially, nepheline syenite is offered, for example, as nepheline syenite 334 with the molecular formula $1K_2O \times 3 Na_2O \times 4 Al_2O_3 \times 8 SiO_2$ (Carl Jäger Tonindustriebedarf GmbH, Germany) or as nepheline syenite 550 with the molecular formula $0.56Na_2O \times 0.44K_2O \times 1Al_2O_3 \times 4 SiO_2$ (Bodmer Ton A G, Einsiedein, Switzerland).

The nepheline syenite to be used according to the invention is preferably brought to the desired particle size, from natural deposits, by grinding and subsequent sifting and/or screening. The invention preferably provides compositions comprising as component B) nepheline syenite having a d95 in the range of about 1 to about 150 µm, preferably in the range of about 10 to about 100 µm, particularly preferably in the range of about 12 to about 70 µm, most particularly preferably in the range of about 15 to about 35 µm, determined by laser diffractometry according to standard ISO 13320.

Particular preference is given to the use of nepheline syenite which, in addition to the above-mentioned d95, has a d50 in the range of about 1 to about 35 µm, preferably in the range of about 2 to about 20 µm, particularly preferably in the range of about 2.5 to about 15 µm, most particularly preferably in the range of about 3 to about 10 µm, wherein the particle size is determined by laser diffractometry according to standard ISO 13320. For clarification, it is pointed out that, within the scope of the present application, standard ISO 13320 is used in the version as applicable at the date of filing of the present invention.

With regard to the d50 and d95 values, the determination thereof and the meaning thereof, reference is made to Chemie Ingenieur Technik (72) p. 273-276, March 2000, Wiley-VCH Verlags GmbH, Weinheim, 2000, according to which the d50 value is the particle size below which 50% of the amount of particles lie (median) and the d95 value is the particle size below which 95% of the amount of particles lie. The particle size distribution or particle size data here relate to so-called surface-based particle sizes, in each case before incorporation into the thermoplastic moulding composition. For particle size determination by laser diffractometry, see C. M. Keck, Moderne Pharmazeutische Technologie 2009, Freie Universität Berlin, Chapter 3.1. or QUANTACHROME PARTIKELWELT NO 6, June 2007, pages 1 to 16.

The nepheline syenite is preferably of particulate, non-cylindrical form and has a length-to-thickness ratio of less than about 5, preferably less than about 3, particularly preferably less than about 2. The value zero is, of course, excluded.

The nepheline syenite is preferably ground in a mill, particularly preferably in a ball mill, most particularly preferably in a ball mill which is lined with ceramics or rubber in order to avoid contamination with iron.

The ground nepheline syenite is preferably sifted in wind sifters, wherein grading can be carried out in one step or in a plurality of steps.

Monitoring of the particle size distribution to be used according to the invention can be carried out, according to the desired particle sizes, by means of screen analyses or by means of a laser beam technique.

Within the scope of the present invention, the expressions nepheline syenite, nepheline syenite powder and ground nepheline syenite are used synonymously.

There come into consideration as the starting material for the grinding in principle any naturally occurring nepheline syenites.

The nepheline syenite to be used according to the invention is preferably provided with a surface modification or size based on aminoalkyltrialkoxysilane. In alternative or preferred embodiments, the nepheline syenite can be provided with additional silane- or siloxane-based surface modification or size. Preferred silanes or siloxanes are glycidyl-, carboxyl-, alkenyl-, acryloxyalkyl- and/or methacryloxyalkyl-functionalized trialkoxysilanes or their aqueous hydrolysates, and combinations thereof.

Most particularly preferred surface modifications are based on aminoalkyltrialkoxysilanes, in particular aminopropyttrimethoxysilane, aminobutyltrimethoxysilane, aminopropyltriethoxysilane, aminobutyltriethoxysilane or their aqueous hydrolysates, with aminopropyltriethoxysilane being most particularly preferred.

The aminoalkyltrialkoxysilanes are used preferably in amounts in the range of about 0.01% by weight to about 1.5% by weight, particularly preferably in amounts in the range of about 0.05% by weight to about 1.0% by weight and most particularly preferably in amounts in the range of about 0.1% by weight to about 0.5% by weight, based on the nepheline syenite for surface coating that is to be used as component B).

The nepheline syenite to be used for grinding can already be treated with surface modification or size. Likewise, the nepheline syenite can be treated with surface modification or size only after grinding.

There can be used as the nepheline syenite that is particularly suitable according to the invention Minex® S-6 from Sibelco Specialty Minerals Europe, Rud, Norway, a nepheline syenite having a d95 of about 22 µm, a d50 of about 7.8 µm and a Mohs hardness of about 6 obtained by grinding nepheline syenite rock and subsequent sifting.

Likewise suitable according to the invention is Treminex® 958-600 having a d95 of about 10 µm, a d50 of about 3 µm and a Mohs hardness of about 6, which is obtainable from Quarzwerke GmbH, Frechen, Germany.

As a result of processing, the nepheline syenite in the moulding compositions which are to be produced from the compositions according to the invention and which are likewise in accordance with the invention, and in products or moulded bodies which are in turn to be produced therefrom, can have a smaller d95 or d50 value therein.

Component C)

The invention preferably further provides compositions comprising as component C) long glass fibres having a starting length in the range of from 1 to 50 mm, particularly preferably in the range of about 1 to about 10 mm, most particularly preferably in the range of about 2 to about 7 mm.

The indicated lengths are starting lengths and define the length of the long glass fibres before processing of any kind. During the treatment and shaping of fibre-reinforced moulding compositions or plastics materials, a fibre shortening generally takes place, which can be attributed to various causes (Turkovich et al., Fibre Fracture in Reinforced Thermoplastic Processing, Polym. Eng. and Sci. 23, 1983, 743-749). As a result of processing, therefore, the glass fibres, preferably long glass fibres, to be used as component C) may have a smaller d97 or d50 value in the moulding compositions or products which are to be produced from the compositions according to the invention. The arithmetic mean of the long glass fibre length after processing is thus frequently only in the range of about 150 μm to about 300 μm.

The fibre length is determined by image analysis, preferably by means of SEM analysis. Where the fibre length is to be determined in products according to the invention, the fibres are previously dissolved out of the composite plastics containing them by Soxhlet extraction and then subjected to SEM analysis.

Glass fibres which are preferably to be used as component C) have a fibre diameter in the range of about 7 to about 18 μm, particularly preferably in the range of about 9 to about 15 μm. The cross-sectional area, or fibre diameter, is determined within the scope of the present invention by means of at least one optical method according to DIN 65571. Optical methods are a) optical microscope and micrometer eyepiece (distance measurement, cylinder measurement), b) optical microscope and digital camera with subsequent planimetry (cross-section measurement), c) laser interferometry and d) projection.

In a preferred embodiment, the glass fibres of component C) are provided with a suitable size system or an adhesion promoter or adhesion promoter system. A silane-based size system or adhesion promoter is preferably used.

Particularly preferred silane-based adhesion promoters for the pretreatment of the glass fibres are silane compounds of the general formula (I)

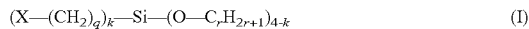

wherein

X represents $NH_2$, carboxyl, HO or

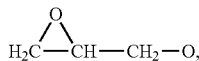

q represents an integer from 2 to 10, preferably from 3 to 4, r represents an integer from 1 to 5, preferably from 1 to 2, and k represents an integer from 1 to 3, preferably 1.

Particularly preferred adhesion promoters for the glass fibres are silane compounds from the group aminopropyl-trmethoxysilane, aminobutyltrimethoxysilane, aminopropyltriethoxysilane, aminobutyltriethoxysilane and the corresponding silanes of formula (I) which contain a glycidyl group or a carboxyl group as the substituent X, wherein carboxyl groups are most particularly preferred.

For the treatment of the glass fibres to be used as component C), the adhesion promoter, preferably the silane compounds according to formula (I), is/are used preferably in amounts of about 0.05 to about 2% by weight, particularly preferably in amounts of about 0.25 to about 1.5% by weight and most particularly preferably in amounts of about 0.5 to about 1% by weight, in each case based on 100% by weight of component C).

According to "http://www.r-g.de/wiki/Glasfasern", glass fibres are produced by the melt-spinning process, preferably by the nozzle-drawing, rod-drawing or nozzle-blowing process. In the nozzle-drawing process, the hot glass mass flows, using gravity, through hundreds of nozzle apertures in a platinum spinning plate. The elementary filaments can be drawn in an unlimited length at a rate of about 3-4 km/minute.

The person skilled in the art distinguishes between various types of glass fibre, of which the types of glass fibre which are preferably to be used according to the invention are listed here:

E-glass, the most widely used material with an optimum price/performance ratio (E-glass from R&G)

H-glass, hollow glass fibres for reduced weight (R&G hollow glass fibre fabrics 160 $g/m^2$ and 216 $g/m^2$)

R, S-glass, for increased mechanical requirements (S2-glass from R&G)

D-glass, borosilicate glass for increased electrical requirements

C-glass, with increased chemical resistance quartz glass, with high temperature stability Further examples are to be found at "http://de.wikipedia.org/wiki/Glasfaser". E-glass fibres have gained most importance for reinforcing plastics materials and are particularly preferred according to the invention. E stands for electrical glass, since it was originally used especially in the electrical industry.

For the production of E-glass, glass melts of pure quartz with additions of limestone, kaolin and boric acid are prepared. As well as comprising silicon dioxide, they also comprise varying amounts of different metal oxides. The composition determines the properties of the products.

Glass fibres of E-glass are the most widely used reinforcing material. The strength properties correspond to those of metals (for example aluminium alloys), the specific weight of laminates being lower than that of metals. E-glass fibres are non-combustible, heat-resistant up to about 400° C. and resistant to most chemicals and weathering influences.

Component D)

The compositions according to the invention comprise melamine cyanurate [CAS No. 37640-57-6] as component D). Melamine cyanurate is understood as being the reaction product of preferably equimolar amounts of melamine and cyanuric acid or isocyanuric acid. These Include Inter alia all conventional and commercially available product grades. Examples are inter alia Melapur® MC 25 and Melapur® MC 50 (BASF SE, Ludwigshafen, Germany). The melamine cyanurate to be used according to the invention preferably comprises particles having mean particle diameters in the range of about 0.1 μm to about 100 μm, particularly preferably in the range of about 0.1 μm to about 30 μm, most particularly preferably in the range of about 0.1 μm to about 7 μm, and can be surface-treated or coated or coated with known compositions. These include preferably organic compounds, which can be applied in monomeric, oligomeric and/or polymeric form to the melamine cyanurate. Coating systems based on silicon-containing compounds, in particular organofunctionalized silanes or organosiloxanes, can particularly preferably be used. Coatings having inorganic components are likewise possible.

Component E)

The titanium dioxide [CAS No. 13463-67-7] to be used as component E) preferably has a mean particle size in the range of about 90 nm to about 2000 nm, particularly preferably in the range of about 200 nm to about 800 nm. The particle size is determined by laser diffractometry (see above).

There are suitable as the titanium dioxide to be used according to the invention as component E) titanium dioxide pigments whose basic structure can be prepared by the sulphate (SP) or chloride (CP) process and which have an anatase and/or rutile structure, preferably a rutile structure. The basic structure does not have to be stabilized, but special stabilization is preferred: in the case of the CP basic structure by an Al doping of about 0.3 to about 3.0% by weight (calculated as $Al_2O_3$) and an oxygen excess in the gas phase during the oxidation of the titanium tetrachloride to titanium dioxide of at least 2%; in the case of the SP basic structure by doping preferably with Al, Sb, Nb or Zn. Particular preference is given to "slight" stabilization with Al, or, in the case of higher Al doping amounts, compensation with antimony. When titanium dioxide is used as a white pigment in paints and surface coatings, plastics materials, etc., it is known that undesirable photocatalytic reactions generated by UV absorption lead to decomposition of the pigmented material. Titanium dioxide pigments thereby absorb light in the near-ultraviolet range, so that electron hole pairs form, which generate highly reactive radicals on the titanium dioxide surface. The radicals formed result in binder degradation in organic media. According to the invention, in order to lower the photoactivity of the titanium dioxide, the titanium dioxide is preferably subjected to inorganic after-treatment, particularly preferably with oxides of Si and/or Al and/or Zr and/or by the use of Sn compounds.

The surface of pigmentary titanium dioxide is preferably covered with amorphous precipitations of oxide hydrates of the compounds $SO_2$ and/or $Al_2O_3$ and/or zirconium oxide. The $Al_2O_3$ shell facilitates the dispersion of the pigment in the polymer matrix; the $SiO_2$ shell makes the charge exchange at the pigment surface more difficult and thereby prevents polymer degradation.

According to the invention, the titanium dioxide is preferably provided with hydrophilic and/or hydrophobic organic coatings, in particular with siloxanes or polyalcohols.

Commercially available products are, for example, Kronos® 2230, Kronos® 2225 and Kronoe® vip7000 from Kronos, Dallas, USA.

The titanium dioxide can be used directly as a powder or in the form of masterbatches, wherein, in the case of masterbatches, polyamide-based masterbatches are preferred. Alternatively, titanium dioxide masterbatches based on polycarbonate, polybutylene terephthalate, polyethylene, maleic-anhydride-grafted polyethylene and/or maleic-anhydride-grafted polypropylene can also be used, it also being possible to use a mixture of the mentioned polymers for the masterbatch.

Component F)

The lubricants and/or demoulding agents to be used as component F) in a preferred embodiment of the compositions according to the invention are preferably long-chained fatty acids, in particular stearic acid or behenic acid, their salts, in particular Ca or Zn stearate, as well as their ester derivatives or amide derivatives, in particular ethylene-bis-stearylamide, montan waxes as well as low molecular weight polyethylene and polypropylene waxes.

Montan waxes within the meaning of the present invention are mixtures of straight-chained, saturated carboxylic acids having chain lengths of about 28 to about 32 carbon atoms.

According to the invention, particular preference is given to the use of lubricants and/or demoulding agents from the group of the esters or amides of saturated or unsaturated aliphatic carboxylic acids having about 8 to about 40 carbon atoms with aliphatic saturated alcohols or amines having about 2 to about 40 carbon atoms as well as metal salts of saturated or unsaturated aliphatic carboxylic acids having about 8 to about 40 carbon atoms.

Most particularly preferably, at least one lubricant and/or demoulding agent from the group ethylene-bis-stearylamide, calcium stearate and ethylene glycol dimontanate is used.

Calcium stearate [CAS No. 1592-23-0] or ethylene-bis-stearylamide [CAS No. 110-30-5] is particularly preferably used.

Ethylene-bis-stearylamide (Loxiol® EBS from Emery Oleochemicals) is most particularly preferably used.

Component G)

At least one laser absorber is used as component G). According to Kunststoffe 8, 2008, 119-121, it is a laser light absorber, preferably for marking plastics products. The laser absorber to be used as component G) is preferably selected from the group antimony trioxide, tin oxide, tin orthophosphate, barium titanate, aluminium oxide, copper hydroxyphosphate, copper orthophosphate, potassium copper diphosphate, copper hydroxide, antimony tin oxide, bismuth trioxide and anthraquinone. Antimony trioxide and antimony tin oxide are particularly preferred. Antimony trioxide is most particularly preferred.

The laser absorber, in particular the antimony trioxide, can be used directly as a powder or in the form of masterbatches. Preferred masterbatches are those based on polyamide or those based on polybutylene terephthalate, polyethylene, polypropylene, polyethylene-polypropylene copolymer, maleic-anhydride-grafted polyethylene and/or maleic-anhydride-grafted polypropylene, whereby the polymers for the antimony trioxide masterbatch can be used individually or in a mixture. Antimony trioxide in the form of a polyamide-6-based masterbatch is most particularly preferably used.

The laser absorber can be used individually or in the form of a mixture of a plurality of laser absorbers.

Laser absorbers are able to absorb laser light of a specific wavelength. In practice, that wavelength is in the range of about 157 nm to about 10.6 μm. Examples of lasers of that wavelength are described in WO2009/003976 A1. Nd:YAG lasers, with which wavelengths of 1064, 532, 355 and 266 nm can be produced, or $CO_2$ lasers are preferably used.

Component H)

In one embodiment, the compositions according to the invention can comprise as component H), in addition to the melamine cyanurate to be used as component D), at least one flame retardant other than component D), preferably a halogen-free and/or phosphorus-free flame retardant.

Preferred halogen-free and/or phosphorus-free flame retardants are nitrogen-containing flame retardants, which can be used individually or in a mixture.

Preferred nitrogen-containing flame retardants are the reaction products of trichlorotriazine, piperazine and morpholine according to CAS No. 1078142-02-5, in particular MCA PPM Triazin HF from MCA Technologies GmbH, Biel-Benken, Switzerland, and condensation products of melamine, such as, for example, melem, melam, melon or higher condensed products of this type. Preferred inorganic nitrogen-containing compounds are ammonium salts.

It is also possible to use salts of aliphatic and aromatic sulphonic acids and mineral flame retardant additives such as aluminium hydroxide and/or magnesium hydroxide, Ca—Mg carbonate hydrates (see DE-A 4 236 122).

Also suitable are flame retardant synergists from the group of the oxygen-, nitrogen- or sulphur-containing metal compounds, preferably zinc oxide, zinc borate, zinc stannate, zinc hydroxystannate, zinc sulphide, molybdenum oxide, magnesium oxide, magnesium carbonate, calcium carbonate, calcium oxide, titanium nitride, boron nitride, magnesium nitride, zinc nitride, zinc phosphate, calcium phosphate, calcium borate, magnesium borate or mixtures thereof.

In an alternative embodiment, however, there can be used as component H) also—where required—halogen-containing and/or phosphorus-containing flame retardants.

Preferred halogen-containing flame retardants are conventional organic halogen compounds, particularly preferably ethylene 1,2-bistetrabromophthalimide, decabromodiphenylethane, tetrabromobisphenol A epoxy oligomer, tetrabromobisphenol A oligocarbonate, tetrachloro-bisphenol A oligocarbonate, polypentabromobenzyl acrylate, brominated polystyrene or brominated polyphenylene ethers, which can be used on their own or in combination with synergists, in particular antimony trioxide or antimony pentoxide.

Preferred phosphorus-containing flame retardants are red phosphorus, metal phosphinates, in particular aluminium phosphinate or zinc phosphinate, metal phosphonates, in particular aluminium phosphonate, calcium phosphonate or zinc phosphonate, derivatives of 9,10-dihydro-9-oxa-10-phosphaphenanthrene 10-oxide (DOPO derivatives), resorcinol bis-(diphenylphosphate) (RDP), including oligomers, as well as bisphenol A bis-diphenylphosphate (BDP), including oligomers, also zinc bis(diethylphosphinate), aluminium tris(diethylphosphinate), melamine phosphate, melamine pyrophosphate, melamine polyphosphate, melamine poly(aluminium phosphate), melamine poly(zinc phosphate) or phenoxyphosphate oligomers and mixtures thereof.

Further flame retardants which are to be used as component H) are carbon formers, particularly preferably phenol-formaldehyde resins, polycarbonates, polyimides, polysulphones, polyether sulphones or polyether ketones, as well as antidripping agents, in particular tetrafluoroethylene polymers.

The flame retardants can be added in pure form as well as via masterbatches or compacts.

Component K)

The compositions comprise as component K) at least one further filler or reinforcing material other than components B) and C).

There can also be used mixtures of two or more different fillers and/or reinforcing materials, preferably based on talc, mica, silicate, amorphous quartz glass, wollastonite, kaolin, amorphous silicas, nano-scale minerals, particularly preferably montmodilonite or nano-boehmite, magnesium carbonate, chalk, feldspar, barium sulphate and/or fibrous fillers and/or reinforcing materials based on carbon fibres, but also untreated, surface-modified or coated spherical fillers and reinforcing materials of glass. Preference is given to the use of mineral particulate fillers based on talc, mica, silicate, wollastonite, kaolin, amorphous silicas, magnesium carbonate, chalk, feldspar and/or barium sulphate. Particular preference is given to the use of mineral particulate fillers based on talc, wollastonite and/or kaolin.

Needle-shaped mineral fillers are particularly preferably also used. According to the invention, needle-shaped mineral fillers are understood as being a mineral filler with a pronounced needle-shaped character. Needle-shaped wollastonites may preferably be mentioned. The needle-shaped, mineral filler preferably has a length:diameter ratio in the range of about 2:1 to about 35:1, particularly preferably in the range of about 3:1 to about 19:1, most particularly preferably in the range of about 4:1 to about 12:1. The mean particle size of the needle-shaped mineral fillers is preferably less than 20 µm, particularly preferably less than about 15 µm, most particularly preferably less than 10 µm, determined using a CILAS GRANULOMETER.

Particular preference is also given, however, to the use of non-fibrous and non-foamed ground glass having a particle size distribution which has a d90 in the range of about 5 to about 250 µm, preferably in the range of about 10 to about 150 µm, particularly preferably in the range of about 15 to about 80 µm, most particularly preferably in the range of about 16 to about 25 µm, and a length in the range of about 0.01 to about 0.5 mm. Non-fibrous and non-foamed ground glass which additionally has a d10 in the range of about 0.3 to about 10 µm, preferably in the range of about 0.5 to about 6 µm, particularly preferably in the range of about 0.7 to about 3 µm, is preferably used. Such non-fibrous and non-foamed ground glass that further has a d50 in the range of about 3 to about 50 µm, preferably in the range of about 4 to about 40 µm, particularly preferably in the range of about 5 to about 30 µm, is most particularly preferred.

With regard to the d10, d50 and d90 values, their determination and their meaning, reference may again be made to Chemie Ingenieur Technik (72) p. 273-276, March 2000, Wiley-VCH Verlags GmbH, Weinheim, 2000, according to which the d10 value Is the particle size below which 10% of the amount of particles lie, the d50 value is the particle size below which 50% of the amount of particles lie (median), and the d90 value is the particle size below which 90% of the amount of particles lie.

A non-fibrous and non-foamed ground glass which is to be used according to the invention preferably has a mean particle size in the range of about 3 to about 60 µm, particularly preferably in the range of about 15 to about 30 µm. The particle size distribution or particle size data relate to so-called surface-based particle sizes, in each case before incorporation into the thermoplastic moulding composition. The diameters of the surface areas of the glass particles are hereby related to the surface areas of imaginary spherical particles (spheres). This is effected using a particle size analyser from Ankersmid (Eye Tech® with the EyeTech® software contained therein and ACM-104 measuring cell, Ankersmid Lab, Oosterhout, Netherlands) which operates by the principle of laser obscuration. However, laser diffractometry according to standard ISO 13320 already mentioned above can also be used for determining the particle size.

According to the invention, the non-fibrous and non-foamed ground glass is preferably of particulate, non-cylindrical form and has a length-to-thickness ratio of less than about 5, preferably less than about 3, particularly preferably less than about 2. The value zero is, of course, excluded.

For delimitation from the present invention, foamed glass, which is frequently also called expanded glass, is understood as being a glass in which glass bubbles, for example of air or carbon dioxide, are included. In contrast to non-foamed glass, however, this inclusion of gas leads to a reduction in density. The non-foamed and non-fibrous ground glass thus does not experience a reduction in density due to any gas inclusions.

For delimitation from the present invention, fibrous glass is understood as being a glass geometry with a cylindrical or oval cross-section, which has a length-to-diameter ratio (UD ratio) of greater than about 5. The non-foamed and non-fibrous ground glass is therefore additionally characterized in that it does not have the glass geometry typical for fibrous glass with a cylindrical or oval cross-section having a length-to-diameter ratio (UD ratio) of greater than about 5.

The non-foamed and non-fibrous ground glass is preferably obtained by grinding glass using a mill, preferably a ball mill and particularly preferably with subsequent sifting or screening. All geometric forms of solidified glass come into consideration as the starting material.

Preferred starting materials for grinding to non-fibrous and non-foamed ground glass are also glass waste, as is obtained in particular in the production of glass products as an undesirable by-product and/or as a main product which does not comply with the specification (so-called offspec goods). This includes in particular waste glass, recycling glass and broken glass, as can be obtained in particular in the production of window glass or bottle glass as well as in the production of glass-containing filling and reinforcing materials, in particular in the form of so-called melt cakes. The glass can be coloured, non-coloured glass being preferred as the starting material.

All glass types as are described, for example, in DIN1259-1 come into consideration in principle as the starting glass for grinding. Preference is given to soda-lime glass, float glass, quartz glass, lead crystal glass, borosilicate glass A-glass and E-glass, with soda-lime glass, borosilicate glass, A-glass and E-glass being particularly preferred, A-glass and E-glass being more particularly preferred, and E-glass being most particularly preferred. With regard to the physical data and composition of E-glass, reference may be made to "http://wiki.r-g.de/index.php?title=Glasfasern". Particularly preferred non-fibrous and non-foamed ground E-glass is distinguished by at least one of the features mentioned below in Table 1:

TABLE 1

| Properties of E-glass | Unit | E-glass |
| --- | --- | --- |
| Density | g/cm$^2$ at 20° C. | 2.6 |
| Tensile strength | MPa | 3400 |
| Tensile modulus of elasticity | GPa | 73 |
| Elongation at break | % | 3.5-4 |
| Chemical composition | Unit | Value |
| $SiO_2$ | % | 53-55 |
| $Al_2O_3$ | % | 14-15 |
| $B_2O_3$ | % | 6-8 |
| CaO | % | 17-22 |
| MgO | % | <5 |
| $K_2O$, $Na_2O$ | % | <1 |
| Other oxides | % | approx. 1 |

Also particularly preferred for the production of the non-foamed and non-fibrous glass are glass types in which the content of $K_2O$ is less than or equal to 2% by weight, based on all the components of the glass. The non-foamed and non-fibrous ground glass can be acquired, for example, from VitroMinerals, Covington, Ga., USA. It is offered as so-called CS Glass Powder in specifications CS-325, CS-500 and CS-600 or also as LA400 (see also "www.glass-fillers.com" or Chris DeArmitt, Additives Feature, Mineral Fillers, COMPOUNDING WORLD, February 2011, pages 28-38 or "www.compoundingworld.com").

The ground glass to be used as an additional filler K) preferably has a density (not bulk densityl) according to ASTM C 693 in the range of about 2400 to about 2700 kg/m$^3$, particularly preferably in the range of about 2400 to about 2600 kg/m$^3$, and therefore clearly differs from foam glass (density=100-165 kg/m$^3$), foam glass granules (density=130-170 kg/m$^3$) and expanded glass (density=110-360 kg/m$^3$), see also AGY product brochure Pub. No. LIT-2006-111 R2 (02/06).

In one embodiment, the non-foamed and non-fibrous ground glass is provided with a surface modification or size based on aminoalkyltrialkoxysilane. In alternative or preferred embodiments, the non-foamed and non-fibrous ground glass to be used as component K) can be provided with additional silane- or siloxane-based surface modification or size, preferably with glycidyl-, carboxyl-, alkenyl-, acryloxyalkyl- and/or methacryloxyalkyl-functionalized trialkoxysilanes or their aqueous hydrolysates, as well as combinations thereof.

Preferred aminoalkyltrialkoxysilanes are aminopropyftrimethoxysilane, aminobutyitri-methoxysilane, aminopropyltriethoxysilane, aminobutyltriethoxysilane or their aqueous hydrolysates, aminopropyltrtethoxysilane being most particularly preferred.

The aminoalkyttrialkoxysilanes are used preferably in amounts of about 0.01% by weight to about 1.5% by weight, particularly preferably in amounts of about 0.05% by weight to about 1.0% by weight and most particularly preferably in amounts of about 0.1% by weight to about 0.5% by weight, based on the non-foamed and non-fibrous ground glass for surface coating to be used as component K).

The starting glass for grinding can already be treated with surface modification or size. The non-foamed and non-fibrous ground glass to be used as component K) can likewise be treated with surface modification or size after grinding.

There can be used in particular MF7900 from Lanxess Deutschland GmbH, Cologne, a non-fibrous and non-foamed ground glass based on E-glass having a d90 of about 54 μm, a d50 of about 14 μm, a d10 of about 2.4 μm and a mean particle size of about 21 μm, in each case based on the particle surface, as well as comprising approximately about 0.1% by weight triethoxy(3-aminopropyl)silane size.

Apart from the non-foamed and non-fibrous ground glass, the fillers and/or reinforcing materials further mentioned as component K) are also surface-modified in a preferred embodiment, preferably with an adhesion promoter or adhesion promoter system, particularly preferably based on silane. Pretreatment is not absolutely essential, however. The silane compounds of the general formula (I) already described above are also suitable as adhesion promoters.

For the treatment of component K), the silane compounds are used for surface coating generally in amounts of about 0.05 to about 2% by weight, preferably about 0.25 to about 1.5% by weight and in particular about 0.5 to about 1% by weight, based on the mineral filler.

As a result of processing to the composition or to the moulding composition or product, the fillers of component K) can also have a smaller d90 or d50 value than in the form originally used.

Component L)

Preferred additives to be used as component L) are antioxidants, UV stabilizers, gamma ray stabilizers, hydrolytic stabilizers, heat stabilizers, antistatics, emulsifiers, nucleating agents, plasticizers, processing aids, flow aids, impact modifiers, colorants and elastomer modifiers. These additives can be used on their own or in a mixture or in the form of masterbatches.

There is used as the antioxidant preferably Lowinox® HD 98, 3,3'-bis(3,5-di-tert-butyl-4-hydroxyphenyl)-N,N'-hexamethylenedipropionamide [CAS No. 23128-74-7].

There are used as UV stabilizers preferably substituted resorcinols, salicylates, benzotriazoles and benzophenones.

There are used as colorants preferably inorganic pigments, in particular ultramarine blue [CAS No. 57455-37-5], iron oxide, titanium dioxide (unless already used as component E)), zinc sulphide [CAS No. 1314-98-3] (unless already used as component H)) or carbon black [CAS No. 1333-86-4]. Organic pigments are further preferably used as colorants, particularly preferably phthalocyanines, quinacridones or perylenes. Dyes, particularly preferably nigrosin [CAS No. 8005-03-6] or anthraquinones, are additionally preferably used as colorants.

There are used as the heat stabilizer preferably sterically hindered phenols and/or phosphites, hydroquinones, aromatic secondary amines such as diphenylamines, substituted resorcinols, salicylates, benzotriazoles and benzophenones, as well as differently substituted representatives of these groups or mixtures thereof. Sterically hindered and thus demanding groups within the meaning of the present invention are preferably tert-butyl groups, isopropyl groups, and aryl groups substituted by sterically demanding groups. Sterically demanding groups within the meaning of the present invention are in particular tert-butyl groups. Particular preference is given to the use of sterically hindered phenols on their own or in combination with phosphites, the use of N,N'-bis[3-(3',5'-di-tert-butyl-4'-hydroxyphenyl)propionyl]hexamethylenediamine [CAS No. 23128-74-7] (for example Irganox® 1098 from BASF SE, Ludwigshafen. Germany) being most particularly preferred.

There are used as nucleating agents preferably sodium or calcium phenylphosphinate, aluminium oxide or silicon dioxide as well as, most particularly preferably, talcum [CAS No. 14807-96-6], this list not being exhaustive.

There are used as flow aids preferably copolymers of at least one α-olefin with at least one methacrylic acid ester or acrylic acid ester of an aliphatic alcohol. Particular preference is given to copolymers in which the α-olefin is composed of ethene and/or propane and the methacrylic acid ester or acrylic acid ester comprises linear or branched alkyl groups having from 6 to 20 carbon atoms as the alcohol component Acrylic acid (2-ethyl)-hexyl ester [CAS No. 103-11-7] is most particularly preferred. As well as being distinguished by their composition, copolymers that are suitable as flow aids are also distinguished by their low molecular weight. Accordingly, flow aids of at least one α-olefin with at least one methacrylic acid ester or acrylic acid ester of an aliphatic alcohol that are to be used as component L) are preferably those which have an MFI value, measured at 190° C. and under a load of 2.16 kg, of at least about 100 g/10 min, preferably of at least about 150 g/10 min, particularly preferably of at least about 300 g/10 min. The MFI, melt flow index, serves to characterize the flow of a melt of a thermoplastic and is subject to standards ISO 1133 or ASTM D 1238. The MFI, or all data relating to the MA, within the scope of the present invention relate to ISO 1133 at 190° C. and with a test weight of 2.16 kg. A copolymer of ethene and acrylic acid (2-ethyl)-hexyl ester is particularly preferably used as the flow aid.

Plasticizers that are preferably to be used as component L) are phthalic acid dioctyl esters, phthalic acid dibenzyl esters, phthalic acid butylbenzyl esters, hydrocarbon oils or N-(n-butyl)benzenesulphonamide.

The elastomer modifiers to be used as component L) preferably include inter alia one or more graft polymers of L.1 from about 5 to about 95% by weight, preferably from about 30 to about 90% by weight, of at least one vinyl monomer, and L.2 from about 95 to about 5% by weight, preferably from about 70 to about 10% by weight, of one or more graft bases having glass transition temperatures < 10° C., preferably <0° C., particularly preferably <−20° C.

The graft base L.2 generally has a mean particle size (d50 value) of about 0.05 to about 10 μm, preferably about 0.1 to about 5 μm, particularly preferably about 0.2 to about 1 μm. Monomers as L.1 are Preferably Mixtures of L.1.1 from 50 to 99% by weight vinyl aromatic compounds and/or vinyl aromatic compounds substituted on the ring, in particular styrene, α-methylstyrene, p-methylstyrene, p-chlorostyrene, and/or methacrylic acid $(C_1-C_8)$-alkyl esters, in particular methyl methacrylate, ethyl methacrylate, and L.1.2 from 1 to 50% by weight vinyl cyanides, in particular unsaturated nitriles such as acrylonitrile and methacrylonitrile, and/or (meth)acrylic acid $(C_1-C_8)$-alkyl esters, in particular methyl methacrylate, glycidyl methacrylate, n-butyl acrylate, tert-butyl acrylate, and/or derivatives, in particular anhydrides and imides, of unsaturated carboxylic acids, in particular maleic anhydride or N-phenylmaleimide.

Preferred monomers L.1.1 are selected from at least one of the monomers styrene, α-methylstyrene and methyl methacrylate, and preferred monomers L.1.2 are selected from at least one of the monomers acrylonitrile, maleic anhydride, glycidyl methacrylate and methyl methacrylate.

Particularly preferred monomers are L.1.1 styrene and L.1.2 acrylonitrile.

Graft bases L.2 suitable for the graft polymers to be used in the elastomer modifiers are, for example, diene rubbers, preferably EPDM rubbers, that is to say rubbers based on ethylene/propylene and optionally diene, also acrylate, polyurethane, silicone, chloroprene and ethylene/vinyl acetate rubbers. EPDM stands for ethylene-propylene-diene rubber.

Preferred graft bases L.2 are diene rubbers, in particular based on butadiene, isoprene, etc., or mixtures of diene rubbers or copolymers of diene rubbers or mixtures thereof with further copolymerizable monomers, in particular according to L.1.1 and L.1.2, with the proviso that the glass transition temperature of component L.2 is <10° C., preferably <0° C., particularly preferably <−10° C.

Particularly preferred graft bases L.2 are ABS polymers (emulsion, mass and suspension ABS), wherein ABS stands for acrylonitrile-butadiene-styrene, as are described, for example, in DE-A 2 035 390 (=U.S. Pat. No. 3,644,574) or in DE-A 2 248 242 (=GB-A 1 409 275) or in Ullmann, Enzyklopädie der Technischen Chemie, Vol. 19 (1980), p. 280 ff. The gel content of the graft base L.2 is preferably at least 30% by weight, particularly preferably at least 40% by weight (measured in toluene).

The elastomer modifiers, or graft polymers, are prepared by radical polymerization, preferably by emulsion, suspension, solution or mass polymerization, in particular by emulsion or mass polymerization.

Particularly suitable graft rubbers are also ABS polymers which are prepared by redox initiation with an initiator system of organic hydroperoxide and ascorbic acid according to U.S. Pat. No. 4,937,285.

Since, as is known, the graft monomers are not necessarily grafted onto the graft base completely in the graft reaction, graft polymers are also to be understood according to the invention as being products that are obtained by (co)polymerization of the graft monomers in the presence of the graft base and that are formed concomitantly during working up.

Acrylate rubbers that are likewise suitable are based on graft bases L.2 that preferably polymers of acrylic acid alkyl esters, optionally with up to about 40% by weight, or based on L.2, of other polymedzable, ethylenically unsaturated monomers. The preferred polymerizable acrylic acid esters include $C_1-C_8$-alkyl esters, preferably methyl, ethyl, butyl, n-octyl and 2-ethylhexyl esters, haloalkyl esters, preferably halo-$C_1-C_6$-alkyl esters, such as chloroethyl acrylate, glycidyl esters, as well as mixtures of these monomers. Graft polymers with butyl acrylate as the core and methyl methacrylates as the shell, in particular Paraloid® EXL2300, Dow Corning Corporation, Midland Mich., USA, are particularly preferred.

For crosslinking, monomers having more than one polymerizable double bond can be copolymerized. Preferred examples of crosslinking monomers are esters of unsaturated monocarboxylic acids having from 3 to 8 carbon atoms and unsaturated monohydric alcohols having from about 3 to about 12 carbon atoms, or saturated polyols having from about 2 to about 4 OH groups and from about 2 to about 20 carbon atoms, preferably ethylene glycol dimethacrylate, allyl methacrylate; polyunsaturated heterocyclic compounds, preferably trivinyl and triallyl cyanurate; polyfunctional vinyl compounds, preferably di- and tri-vinylbenzenes; but also triallyl phosphate and diallyl phthalate.

Preferred crosslinking monomers are allyl methacrylate, ethylene glycol dimethacrylate, diallyl phthalate and heterocyclic compounds which have at least 3 ethylenically unsaturated groups.

Particularly preferred crosslinking monomers are the cyclic monomers triallyl cyanurate, triallyl isocyanurate, triacryloylhexahydro-s-triazine, triallylbenzenes. The amount of crosslinking monomers is preferably in the range of about 0.02 to about 5% by weight, in particular in the range of about 0.05 to about 2% by weight, based on the graft base L.2.

In the case of cyclic crosslinking monomers having at least 3 ethylenically unsaturated groups, it is advantageous to limit the amount to less than about 1% by weight of the graft base L.2.

Preferred "other" polymerizable, ethylenically unsaturated monomers which can optionally be used, in addition to the acrylic acid esters, for preparing the graft base L.2 are acrylonitrile, styrene, α-methylstyrene, acrylamides, vinyl $C_1$-$C_6$-alkyl ethers, methyl methacrylate, glycidyl methacrylate, butadiene. Preferred acrylate rubbers as graft base L.2 are emulsion polymers having a gel content of at least 60% by weight.

Further graft bases according to L.2 which are preferably suitable are silicone rubbers having graft-active sites, as are described in DE-A 3 704 657 (=U.S. Pat. No. 4,859,740), DE-A 3 704 655 (=U.S. Pat. No. 4,861,831), DE-A 3 631 540 (=U.S. Pat. No. 4,806,593) and DE-A 3 631 539 (=U.S. Pat. No. 4,812,515).

In addition to elastomer modifiers that are based on graft polymers, elastomer modifiers that are not based on graft polymers and that have glass transition temperatures < 10° C., preferably < 0° C., particularly preferably <−20° C., can likewise be used. These preferably include elastomers having a block copolymer structure as well as also thermoplastically meltable elastomers, in particular EPM, EPDM and/or SEBS rubbers (EPM=ethylene-propylene copolymer, EPDM=ethylene-propylene-diene rubber and SEBS=styrene-ethene-butene-styrene copolymer).

Particular preference is given according to the invention to compositions comprising polyamide 6, nepheline syenite, glass fibres and melamine cyanurate.

Particular preference is given according to the invention to compositions comprising polyamide 6, nepheline syenite, glass fibres, melamine cyanurate and ethylene-bis-stearylamide.

Particular preference is given according to the invention to compositions comprising polyamide 6, nepheline syenite, glass fibres, melamine cyanurate, ethylene-bis-stearylamide and 3,3'-bis(3,5-di-tert-butyl-4-hydroxyphenyl)-N,N'-hexamethylenedipropionamide.

Method

The present invention relates additionally to a method for producing products, preferably electrical components, particularly preferably RCD devices and miniature circuit breakers, most particularly preferably miniature circuit breakers having rated currents of >16 A, especially preferably miniature circuit breakers having rated currents of >32 A, most especially preferably miniature circuit breakers having rated currents >64 A, by using the compositions according to the invention in injection moulding including the special processes GIT (gas injection technique), WIT (water injection technique) and PIT (projectile injection technique), in extrusion processes, including profile extrusion, or in blow moulding.

Products within the meaning of the invention are, however, also semi-finished products, in particular composites or overmoulded composites, comprising reinforcements, preferably reinforcements of continuous fibres and/or long fibres, wherein compositions according to the invention are used either in the matrix or in the injection moulding composition to be used for overmoulding, or in both. A method for producing composites reinforced with continuous fibres and having a thermoplastic matrix is known, for example, from DE 38 13 694 A1. Polyamide-based composites and their production are known, for example, from WO 2011/014754 A1 or WO 2014/204522 A1, overmoulded polyamide-based composite structures are described, for example, in WO 2011/014751 A1. The content of these citations is included in its entirely in the present application.

In order to produce those products, the individual components in the compositions according to the invention, that is to say components A), B), C), D) and optionally additionally at least one of components E) to L), are first mixed in at least one mixer and the mixture, which is then in the form of a moulding composition, is either fed through at least one mixer outlet directly to further processing or is discharged in the form of a strand and cut into granules of a desired length by means of a granulator, preferably a rotating knife cylinder, in order to be available for later processing.

Since most processors require plastics material in the form of granules, granulation plays an important role. A distinction is made in principle between hot and cold cutting. Depending on the processing, different grain shapes are obtained. In the case of hot cutting, the granules are obtained with a bead or lenticular grain shape; in the case of cold cutting, the granules are obtained in cylindrical shapes or cube shapes. Compositions according to the invention, or moulding compositions in granule form based thereon, are preferably obtained by cold cutting.

The person skilled in the art is free to use different mixers which are suitable for achieving an optimal mixing result in respect of a mixture of the components in the compositions to be used according to the invention. An extruder is a preferred mixer within the meaning of the present invention. Preferred extruders are single-screw extruders or twin-screw extruders as well as the respective sub-groups, most particularly preferably conventional single-screw extruders, conveying single-screw extruders, counter-rotating twin-screw extruders or co-rotating twin-screw extruders. These are known to the person skilled in the art from Technische Thermoplaste 4. Polyamide, Eds.: G. W. Becker and D. Braun, Carl Hanser Verlag, 1998, p. 311-314 as well as from K. Brast, dissertation "Verarbeitung von Langfaser-verstärkten Thermoplasten im direkten Plastifizier-/Pressverfahren", Rheinisch-Westfälische Technische Hochschule Aachen, 2001, p. 30-33.

The products according to the invention, preferably electrical or electronic products, are finally produced from the compositions according to the invention in the form of a moulding composition or granules by shaping processes. Preferred shaping processes are injection moulding or extrusion.

Methods according to the Invention for producing products by extrusion or injection moulding operate preferably at melt temperatures in the range of about 230 to about 330° C., particularly preferably at melt temperatures in the range of about 250 to about 300° C., and preferably additionally at pressures not exceeding about 2500 bar, particularly preferably at pressures not exceeding about 2000 bar, most particularly preferably at pressures not exceeding about 1500 bar and especially preferably at pressures not exceeding about 750 bar.

The injection moulding method is characterized in that the composition according to the invention, preferably in granule form, is melted (plasticized) in a heated cylindrical cavity and injected in the form of an injection moulding composition, under pressure, into a temperature-controlled cavity. After the composition has cooled (solidified), the injection moulded part is demoulded. A distinction is made between the following working steps
1. plasticization/melting
2. injection phase (filling operation)
3. hold period (because of thermal contraction upon crystallization)
4. demoulding.

An injection moulding machine consists of a clamping unit, the Injection unit, the drive and the control system. The clamping unit includes fixed and movable clamping plates for the mould, an end plate as well as pillars and drive for the movable mould clamping plate (toggle joint or hydraulic clamping unit).

An injection unit comprises the electrically heatable cylinder, the drive for the screw (motor, gear) and the hydraulic system for displacing the screw and injection unit. The purpose of the injection unit is to melt, meter and inject the composition to be used according to the invention, in particular in the form of granules, and apply a holding pressure thereto (on account of contraction). The problem of return flow of the melt within the screw (leakage flow) is solved by non-return valves.

In the injection mould, the incoming melt is then released and cooled and the component to be produced is thus manufactured. Two mould halves are always required. The following functional complexes are distinguished in injection moulding:
  gating system
  shaping inserts
  ventilation
  machine housing and force absorption
  demoulding system and transmission of motion
  temperature control The special injection moulding processes GIT (gas injection technique), WIT (water injection technique) and projectile injection technique (PIT) are specialized injection moulding processes for producing hollow workpieces. One difference compared with standard injection moulding is a special working step towards the end of the phase in which the mould is filled, or after the casting mould has been partially filled to a defined degree. In the process-specific working step, a process medium is injected via a so-called injector into the molten core of the premoulded part to form a cavity. The process medium is gas—generally nitrogen—in the case of GIT and water in the case of WIT. In the case of PIT, a projectile is shot into the molten core and a cavity is thus formed.

Unlike Injection moulding, in extrusion there is used a continuously shaped plastics strand, comprising the composition according to the invention, in an extruder, the extruder being a machine for producing thermoplastic moulded articles. A distinction is made between
  single-screw extruders and twin-screw extruders and the respective sub-groups,
  conventional single-screw extruders, conveying single-screw extruders,
  counter-rotating twin-screw extruders and co-rotating twin-screw extruders.

Profiles within the meaning of the present invention are (structural) parts which have an identical cross-section over their entire length. They can be produced by the profile extrusion process. The basic process steps of the profile extrusion process are:
1. plasticizing and making available the thermoplastic melt in an extruder,
2. extruding the thermoplastic molten strand through a calibrating sleeve, which has the cross-section of the profile to be extruded,
3. cooling the extruded profile in a calibrating table,
4. transporting the profile further, with take-off downstream of the calibrating table,
5. cutting the previously continuous profile to length in a cutting system,
6. collecting the cut profiles on a collecting table.

A description of the profile extrusion of polyamide 6 and polyamide 66 is given in Kunststoff-Handbuch 3/4, Polyamide, Carl Hanser Verlag, Munich 1998, pages 374-384.

Blow moulding processes within the meaning of the present invention are preferably standard extrusion blow moulding, 3D extrusion blow moulding, suction blow moulding processes and sequential co-extrusion.

The basic process steps of standard extrusion blow moulding according to (Thielen, Hartwig, Gust, "Blasformen von Kunststoffhohlköpern", Carl Hanser Verlag, Munich 2006, pages 15 to 17) are:
1. plasticizing and making available the thermoplastic melt in an extruder,
2. deflecting the melt downwards in a vertical flow movement and forming a tubular molten "premoulded part",
3. enclosing the freely suspended premoulded part in a mould, the blow mould, which generally consists of two half-shells,
4. inserting a blow mandrel or a blowing pin (optionally a plurality of blowing pins),
5. blowing the plastics premoulded part against the cooled wall of the blow mould, where the plastics material cools, hardens and assumes the final shape of the moulding,
6. opening the mould and demoulding the blow-moulded part,
7. removing the squeezed "parison waste" at both ends of the blow-moulded part.

Further steps of post-processing can follow.

Products with complex geometry and multiaxial curvatures can also be produced by means of standard extrusion blow moulding. However, the products obtained then contain a large proportion of excess, squeezed material and have a weld seam in large regions.

In 3D extrusion blow moulding, which is also referred to as 3D blow moulding, therefore, in order to avoid weld seams and to reduce the amount of material used, a premoulded part which is adapted in terms of its diameter to the cross-section of the article is deformed by means of special devices and manipulated and then introduced directly into the blow mould cavity. The remaining pinch-off edge at the ends of the article is thus reduced to a minimum (Thielen, Hartwig, Gust, "Blasformen von Kunststoffhohlkörpern", Carl Hanser Verlag, Munich 2006, pages 117-122).

In the suction blow moulding process, which is also referred to a suction blow moulding, the premoulded part is conveyed directly from the nozzle of the tube die into the closed blow mould and "sucked" through the blow mould via an air stream. After the bottom end of the premoulded part has left the blow mould, the premoulded part is squeezed at the top and bottom by clamping elements, and the blowing and cooling operations then follow (Thielen, Hartwig, Gust, "Blasformen von Kunststoffhohlkörpern", Carl Hanser Verlag, Munich 2006, page 123).

Use

The present invention also provides the use of nepheline syenite for producing polyamide-based products, in particular for achieving a high heat deflection temperature with, at the same time, low isotropic shrinkage behaviour and good self-extinguishing properties in the glow wire test according to IEC60695-2-12, preferably even at thin wall thicknesses of about 0.8 mm.

The invention further provides the use of the compositions according to the invention as moulding compositions in injection moulding, including the special processes GIT (gas injection technique), WIT (water injection technique) and PIT (projectile injection technique), in extrusion processes, including profile extrusion, in blow moulding, particularly preferably standard extrusion blow moulding, 3D extrusion blow moulding processes or suction blow moulding processes, in order to produce products according to the invention therefrom.

However, the present invention relates also to the use of the compositions according to the invention for producing products, preferably electrical components or electronic components, particularly preferably RCD devices and miniature circuit breakers, most particularly preferably miniature circuit breakers having rated currents of >16 A, especially preferably miniature circuit breakers having rated currents of >32 A, most especially preferably miniature circuit breakers having rated currents of >64 A, as well as composite structures or overmoulded composite structures.

It will be understood that the specification and examples are illustrative but not limitative of the present invention and that other embodiments within the spirit and the scope of the invention will suggest themselves to those skilled in the art.

EXAMPLES

Corresponding plastics compositions were first prepared by compounding. To that end, the individual components according to Table 2 were mixed at temperatures between 240 and 280° C. in a twin-shaft extruder (ZSK 25 compounder from Coperion Werner & Pfleiderer (Stuttgart, Germany)), and the mixture was discharged in the form of a strand, cooled until it could be granulated, and then granulated. After drying (generally for two days at 70° C. in a vacuum drying cabinet), the granules were processed at temperatures in the range of from 240 to 280° C. to standard test specimens for the respective tests.

The glow wire resistance was determined by means of the glow wire test GWFI (glow wire flammability index) according to IEC 60695-2-12 on round plates having a diameter of 80 mm and a thickness of 0.75 mm.

The heat deflection temperature was determined according to ISO 75-1,-2 at an applied flexural stress of 1.8 MPa (HDT-A) on test specimens measuring 80 mm·10 mm·4 mm.

The moulding shrinkage, in each case parallel and perpendicular to the direction of injection, was determined according to ISO 294-4 on test specimens measuring 60 mm·60 mm·2 mm at a melt temperature of 260° C. and a mould temperature of 80° C. at 600 bar holding pressure.

As a measure of the isotropy, the warpage was then calculated as the quotient of the moulding shrinkage parallel to the direction of injection and the moulding shrinkage perpendicular to the direction of injection. For the isotropy so calculated, materials can be said to be low-warpage at values above 0.8.

For example, a commercial polyamide 6 comprising 30% by weight glass fibres has a moulding shrinkage of 0.3%/0.7% [parallel/perpendicular], which then gives an isotropy value, according to the above formula, of only 0.4 and thus indicates considerable warpage.

In the case of the cited standards, the versions applicable at the date of filing of the present invention are used.

The Following were Used in the Tests:

Component A): Polyamide 6 (Durethan® B26, Lanxess Deutschland GmbH, Cologne, Germany)

Component B): Nepheline syenite (Minex® S-6 from Sibelco Specialty Minerals Europe, Rud, Norway)

Component C): Chopped glass fibres CS 7997 from Lanxess Deutschland GmbH, Cologne, Germany [mean fibre diameter 11 µm, mean fibre length 4.5 mm, E-glass]

Component D): Melamine cyanurate, [CAS No. 37640-57-6] (Melapur® MC25, from BASF, Ludwigshafen, Germany)

Component H): Ethylene-bis-stearylamide [CAS No. 110-30-5] as Loxiol® EBS from Emery Oleochemicals Component L): Lowinox® HD 98-50 D-TDS, 3,3'-bis(3,5-di-tert-butyl-4-hydroxyphenyl)-N,N'-hexamethylenedipropionamide [CAS No. 23128-74-7]

TABLE 2

| Components | | 1 |
|---|---|---|
| A | [%] | 70.8 |
| B | [%] | 20 |
| C | [%] | 5 |
| D | [%] | 4 |
| H | [%] | 0.1 |
| L | [%] | 0.1 |
| GWFI (0.75 mm) | [° C.] | 960 |
| HDT A | [° C.] | >135 |
| Moulding shrinkage (parallel) | [%] | 0.6 |
| Moulding shrinkage (perpendicular) | [%] | 0.7 |
| Isotropy [parallel/perpendicular] | | 0.8 |

The amounts of the components are in % by weight, based on the total moulding composition.

The example in Table 2 shows that the composition according to the invention achieves the maximum temperature of 960° C. in the glow wire test even in the case of test specimens having a thickness of only 0.75 mm while at the same time having a very low tendency to warpage, with an isotropy above 0.8, and nevertheless exhibits heat deflection temperatures according to HDT A above 135° C.

What is claimed is:

1. A composition comprising:
   100 parts by weight of polyamide 6,
   20 to 30 parts by weight of nepheline syenite,
   6 to 9 parts by weight of long glass fibres, and
   5 to 15 parts by weight of melamine cyanurate.

2. The composition according to claim 1, wherein:
the polymer comprises
the nepheline syenite has a d95 of about 1 to about 150 μm and a d50 of about 1 to about 35 μm;
the long glass fibres having a starting length of 1 to 50 mm, and a fibre diameter of about 7 to about 18 μm; and
the melamine cyanurate particles having mean particle diameter of about 0.1 μm to about 100 μm.

3. The composition according to claim 1, wherein the polyamide has a viscosity number of about 80 to about 180 ml/g, as determined in accordance with ISO 307, in a 0.5% by weight solution in 96% by weight sulphuric acid at 25° C.

4. The composition according to claim 1, wherein:
the nepheline syenite has a particle size d95 of 10 to 100 μm and a d50 of about 2 to about 20 μm, determined by laser diffractometry according to standard ISO 13320; and
the melamine cyanurate has mean particle diameter of about 0.1 μm to about 30 μm.

5. The composition according to claim 1, wherein:
the nepheline syenite has a d95 of about 12 to about 70 μm, and a mean particle size (d50) of 2.5 to 15 μm, determined by laser diffractometry according to standard ISO 13320; and
the melamine cyanurate has mean particle diameter of about 0.1 μm to about 7 μm.

6. The composition according to claim 1, wherein the nepheline syenite is of particulate, non-cylindrical form having a length-to-thickness ratio of less than 5.

7. The composition according to claim 1, wherein the glass fibers are long glass fibres having a starting length of about 2 to about 7 mm, and a fibre diameter of about 9 to about 15 μm.

8. The composition according to claim 1, wherein
the nepheline syenite has a particle size d95 of 10 to 100 μm and a d50 of about 2 to about 20 μm, determined by laser diffractometry according to standard ISO 13320;
the long glass fibers have a starting length of about 2 to about 7 mm, and a fibre diameter of about 9 to about 15 μm; and
the melamine cyanurate has a mean particle diameter of about 0.1 μm to about 30 μm.

9. The composition according to claim 1, further comprising titanium dioxide.

10. The compositions according to claim 1, further comprising at least one lubricant and/or demoulding agent.

11. The composition according to claim 1, further comprising at least one laser absorber selected from the group antimony trioxide, tin oxide, tin orthophosphate, barium titanate, aluminium oxide, copper hydroxyphosphate, copper orthophosphate, potassium copper diphosphate, copper hydroxide, antimony tin oxide, bismuth trioxide and anthraquinone.

12. The composition according to claim 1, further comprising at least one further flame retardant other than melamine cyanurate.

13. The composition according to claim 10, wherein the at least one further flame retardant comprises a halogen-free and/or phosphorus-free flame retardant.

14. The composition according to claim 1, further comprising at least one filler other than nepheline syenite and melamine cyanurate.

15. The composition according to claim 1, wherein:
the nepheline syenite has a d95 of about 15 to about 35 μm, and a mean particle size (d50) of about 3 to about 10 μm, determined by laser diffractometry according to standard ISO 13320;
the glass fibres are long glass fibres having a starting length of about 2 to about 7 mm, and a fibre diameter of about 9 to about 15 μm; and
the melamine cyanurate has a mean particle size of about 0.1 to about 7 μm.

16. The composition according to claim 15, further comprising 2 or more of the following components:
titanium dioxide;
at least one lubricant;
at least one demoulding agent;
at least one laser absorber;
at least one further flame retardant other than melamine cyanurate; and
at least one additional filler other than nepheline syenite and melamine cyanurate.

17. The composition according to claim 1, wherein:
the glass fibres are E-glass fibres having a mean fibre diameter of 10 μm to 12 μm and/or a mean fibre length of 4 to 5 mm, and
the composition further comprises:
ethylene-bis-stearylamide as an additional flame retardant; and
3,3'-bis(3,5-di-tert-butyl-4-hydroxyphenyl)-N,N'-hexamethylenedipropionamide as an antioxidant.

18. A moulding comprising the composition according to claim 1.

19. A method for producing products, the method comprising:
mixing the components of the composition according to claim 1 in at least one mixer to produce a moulding composition;
feeding the mixture, in the form of the moulding composition, through at least one mixer outlet and at least one of:
processing the mixture further; and
forming the mixture into a strand and cutting the strand into granules of a desired length by means of a granulator, and
shaping the moulding composition or granules in a shaping process.

20. The method of claim 19 wherein:
the nepheline syenite has a mean particle size (d50) of 1 μm to 35 μm, determined by laser diffractometry according to standard ISO 13320; and
the glass fibers are long glass fibres having a starting length of 1 to 50 mm; and
the melamine cyanurate has a mean particle size of 0.1 μm to 100 μm.

* * * * *